(12) United States Patent
Shen

(10) Patent No.: US 7,916,475 B2
(45) Date of Patent: Mar. 29, 2011

(54) ELECTRONIC DEVICE HAVING MOVABLE DISPLAY AND SLIDING APPARATUS THEREOF

(75) Inventor: Wen-Bin Shen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 113 days.

(21) Appl. No.: 12/334,540

(22) Filed: Dec. 15, 2008

(65) Prior Publication Data
US 2010/0097755 A1 Apr. 22, 2010

(30) Foreign Application Priority Data
Oct. 20, 2008 (CN) ...................... 2008 2 0302492 U

(51) Int. Cl.
*H05K 5/00* (2006.01)
*E05D 11/00* (2006.01)
*H04M 1/00* (2006.01)
*H05K 7/00* (2006.01)

(52) U.S. Cl. ......... 361/679.56; 361/679.55; 361/679.58; 16/223; 455/575.3; 455/575.4

(58) Field of Classification Search ............. 361/679.01, 361/679.02, 679.08, 679.09, 679.3, 679.55–679.59; 345/156, 157, 168, 169, 184; 455/575.1, 455/575.3, 575.4, 575.8, 455; 340/384.71, 340/566; 200/329; 174/535; 29/557; 439/165; 16/223; 108/39
See application file for complete search history.

(56) References Cited

U.S. PATENT DOCUMENTS

| | | | |
|---|---|---|---|
| 2008/0096619 A1* | 4/2008 | Kuga et al. ................. | 455/575.4 |
| 2008/0174942 A1* | 7/2008 | Yang et al. .................... | 361/680 |
| 2009/0069059 A1* | 3/2009 | Min et al. .................... | 455/575.4 |
| 2009/0145337 A1* | 6/2009 | Shen et al. ....................... | 108/39 |

* cited by examiner

*Primary Examiner* — Jayprakash N Gandhi
*Assistant Examiner* — Jerry Wu
(74) *Attorney, Agent, or Firm* — Zhigang Ma

(57) ABSTRACT

An electronic device includes a main body, a pivoting member pivotably mounted to the main body, a display, a sliding piece fixed to the inner surface of the display and capable of sliding relative to the pivoting member, and a resilient member positioned at one side of the sliding piece opposite to the pivoting member for driving the sliding piece to slide relative to the pivoting member.

9 Claims, 4 Drawing Sheets

ELECTRONIC DEVICE HAVING MOVABLE DISPLAY AND SLIDING APPARATUS THEREOF

BACKGROUND

1. Technical Field

The present disclosure relates to an electronic device having a movable display and a sliding apparatus of the electronic device.

2. Description of Related Art

Usually, displays of electronic devices are movable for convenient operation and to save space. For example, a clamshell mobile phone generally has a main body and a rotatable and slidable display mounted to the main body by a hinge and a sliding apparatus. The display firstly slides to a predetermined position, and then is rotatable in this position. The sliding apparatus usually includes a sliding member, a bracket, and a resilient member positioned between the sliding member and the bracket. However, a plurality of recessed portions is usually defined in the sliding member facing the bracket or defined in the bracket facing the sliding member, for receiving the resilient member, which is unsightly.

Therefore, an electronic device which overcomes the above-described deficiencies is desired.

DETAILED DESCRIPTION OF THE EMBODIMENTS

Figure 1:
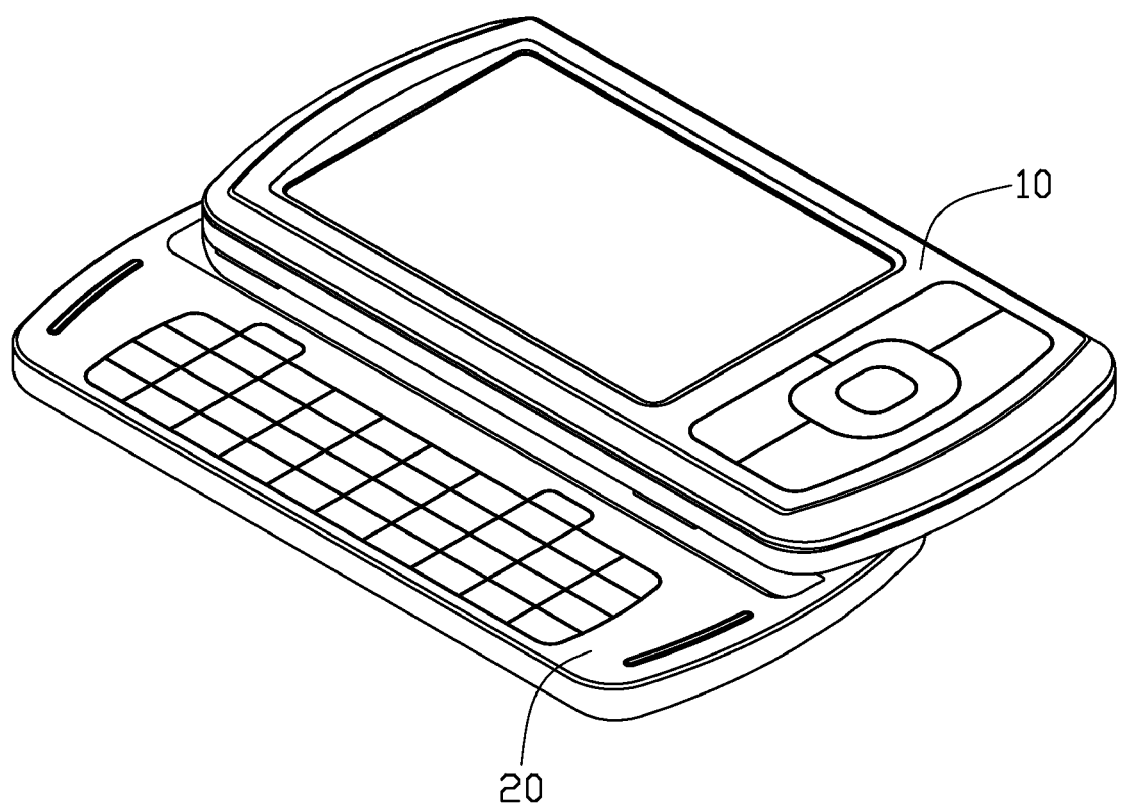
FIG. 1 is an assembled, isometric view of an exemplary embodiment of an electronic device.
Figure 2:
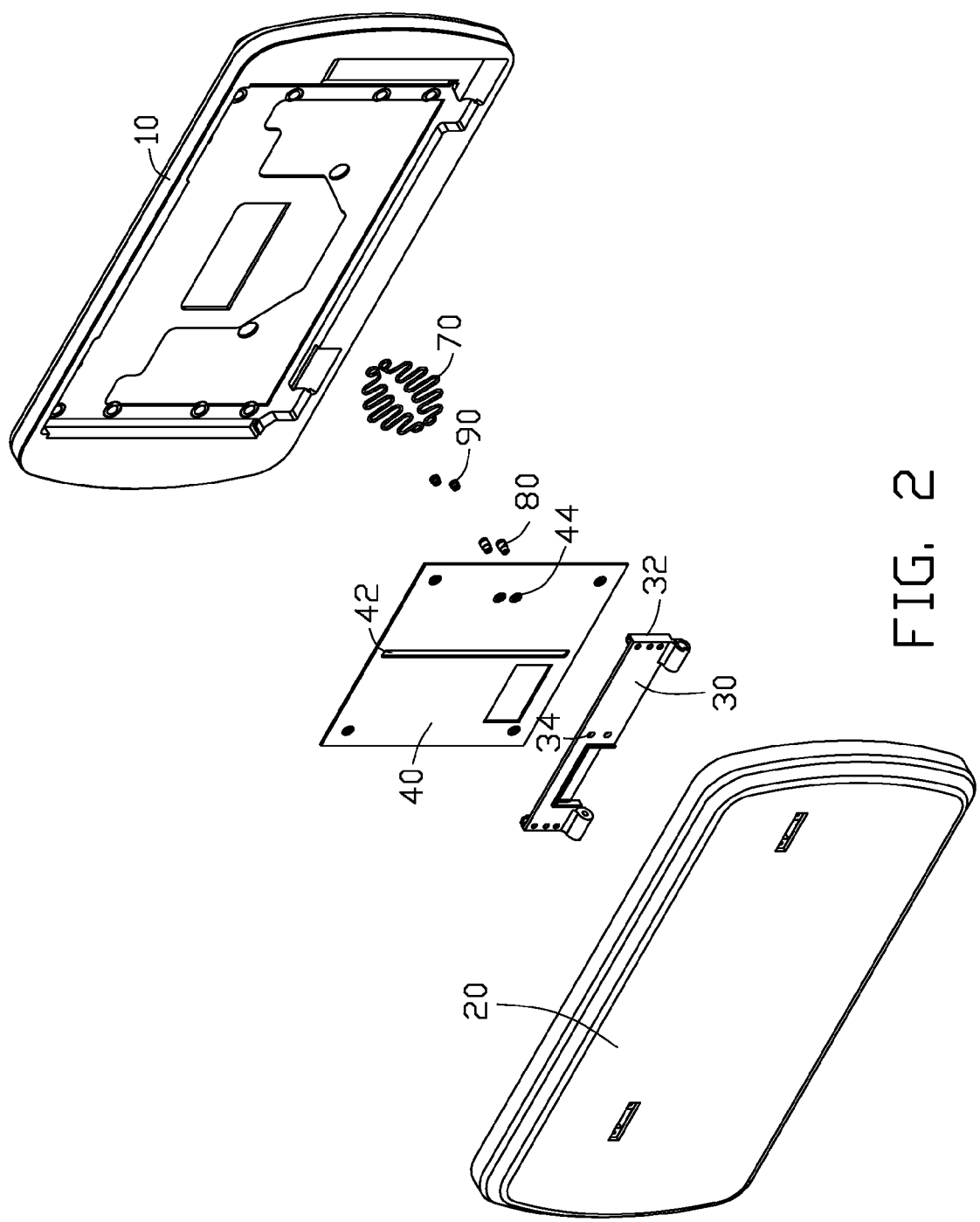
FIG. 2 is an exploded, isometric view of the electronic device of FIG. 1, the electronic device including a main body, a display, and a sliding apparatus.

Referring to FIGS. 1 and 2, an exemplary embodiment of an electronic device, such as a personal digital assistant (PDA), includes a display 10, a main body 20, and a sliding apparatus. The sliding apparatus includes a pivoting member 30 pivotably mounted to the main body 20, a sliding piece 40 mounted to the back of the display 10, two resilient members 70, two first fasteners 90, and two second fasteners 80.

Figure 3:
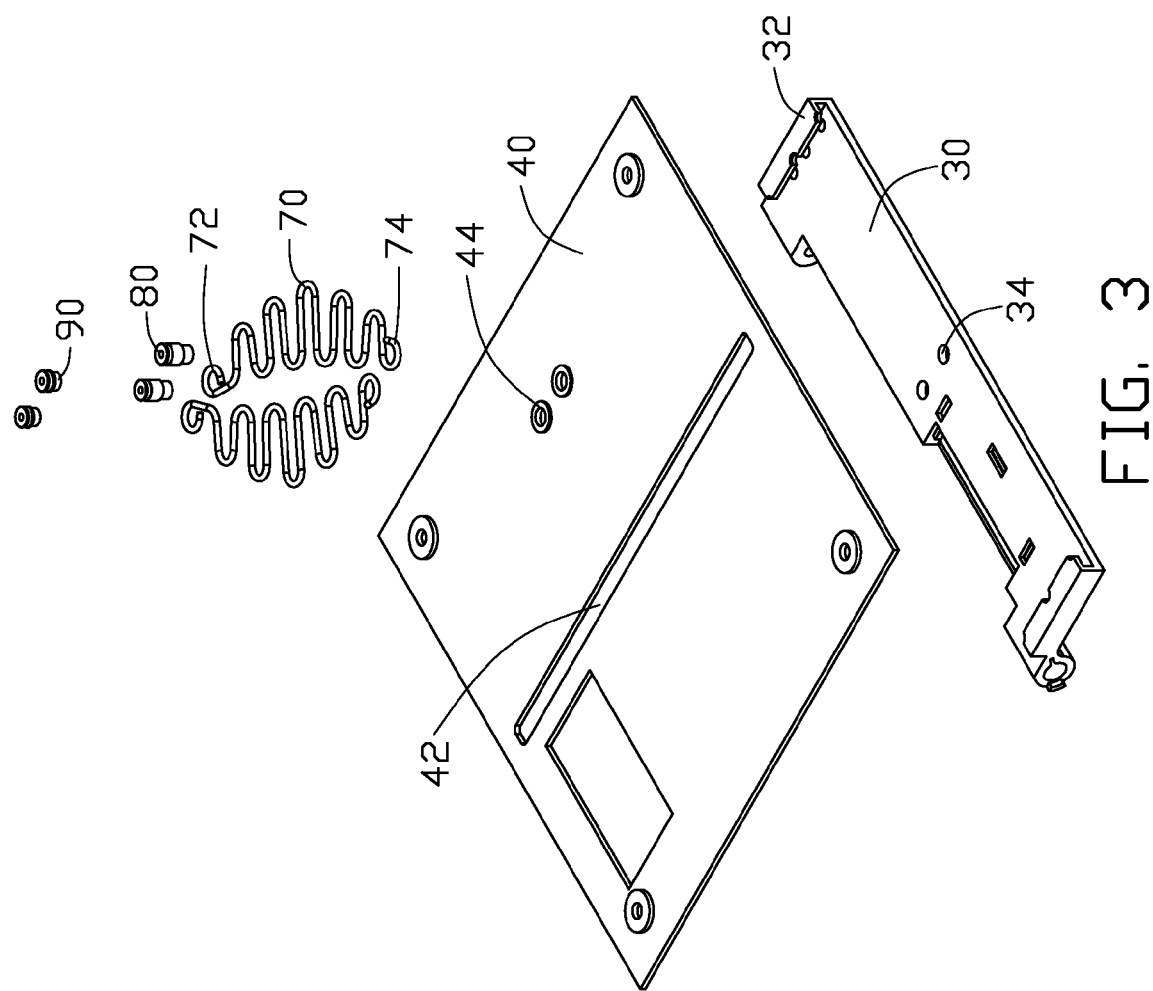
FIG. 3 is an enlarged, isometric view of the sliding apparatus of FIG. 2, but viewed from another perspective.

Referring to FIG. 3, two parallel sliding rails 32 are formed at two opposite ends of the pivoting member 30, for the sliding piece 40 sliding therein. Two mounting holes 34 are defined in a middle portion of the pivoting member 30, along an extending direction of the sliding rails 32.

The sliding piece 40 defines an elongate slot 42 in a middle portion thereof along a sliding direction of the sliding piece 40. Two mounting portions 44 are formed on the sliding piece 40 at one side of the slot 42.

In the instant embodiment, each of the resilient members 70 is a flat extension spring with ring-shaped first and second mounting ends 72,74 formed at opposite ends thereof.

The first and second fasteners 90 and 80 may be bolts or rivets.

Figure 4:
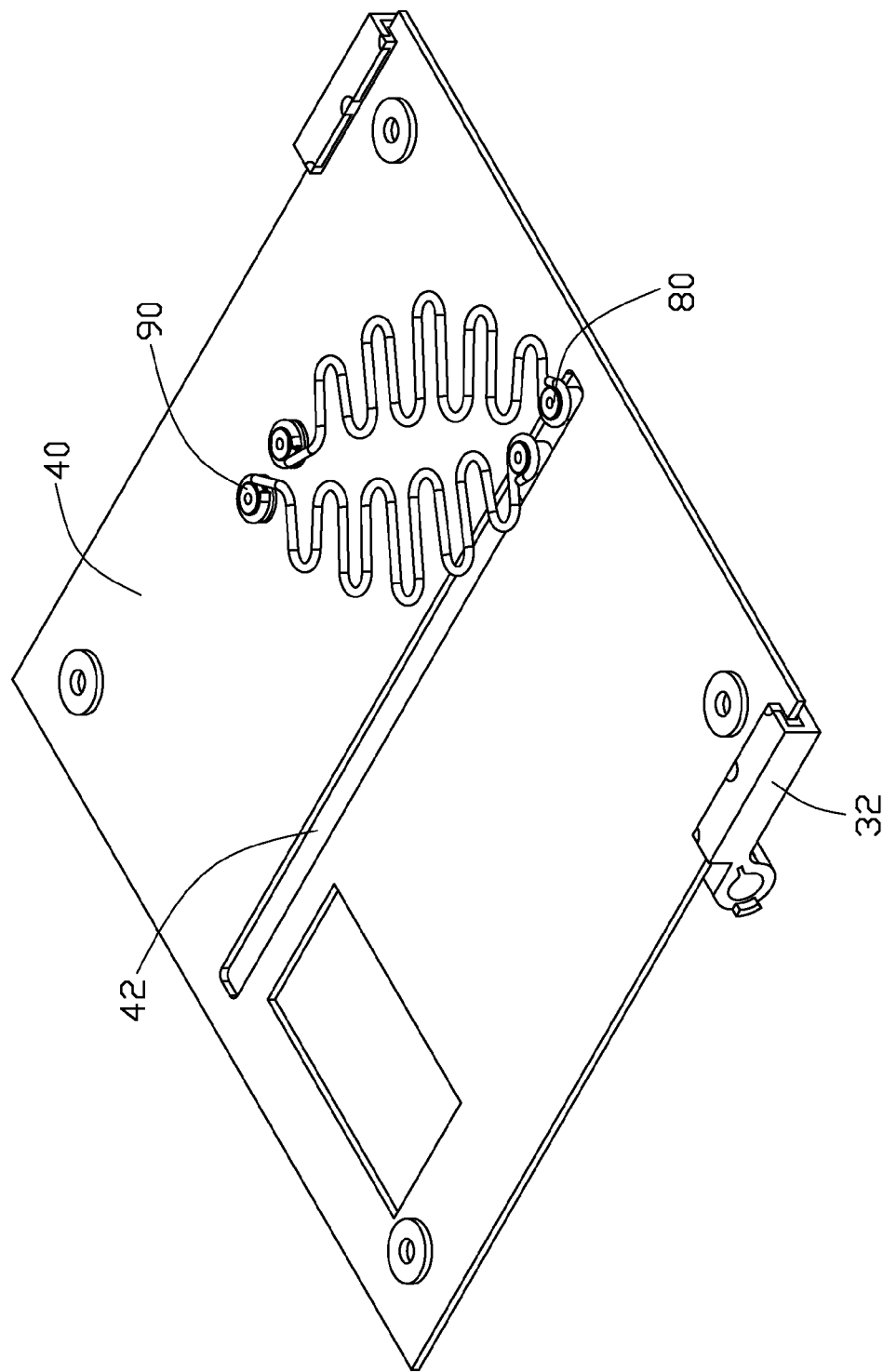
FIG. 4 is an assembled view of the sliding apparatus of FIG. 3.

Referring to FIG. 4, in assembly of the sliding apparatus, the sliding piece 40 is positioned between the sliding rails 32 of the pivoting member 30 and slidably mounted to a first side of the pivoting member 30. The resilient members 70 are attached to a second side of the sliding piece 40 opposite to the pivoting member 30. The first mounting ends 72 of the resilient members 70 closely fit about the corresponding first fasteners 90 that are engaged with the mounting portions 44 of the sliding piece 40. The second mounting ends 74 of the resilient members 70 closely fit about the corresponding second fasteners 80 that are inserted through the slot 42 to screw in the mounting holes 34 of the pivoting member 30.

The pivoting member 30 is pivotably mounted to the main body 20 via a hinge (not shown). The sliding piece 40 is fixed to the inner surface of the display 10. Opposite ends of the sliding piece 40 are slidably received in the corresponding sliding rails 32 of the pivoting member 30. Thus, the display 10 is slidable relative to the main body 20. The resilient members 70 are capable of driving the display 10 to automatically slide to cover the main body 20.

In the instant embodiment, the resilient members 70 are positioned at one side of the sliding piece 40 opposite to the pivoting member 30, but not between the sliding piece 40 and the pivoting member 30. Thus the sliding piece 40 or the pivoting member 30 does not need a plurality of recessed portions, and so is better looking.

It is to be understood, however, that even though numerous characteristics and advantages of the embodiments have been set forth in the foregoing description, together with details of the structure and function of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device comprising:
a main body;
a pivoting member pivotably mounted to the main body;
a display;
a sliding piece fixed to the inner surface of the display, and capable of sliding relative to the pivoting member;
a resilient member positioned between an inner surface of the display and the sliding piece, for driving the sliding piece to slide relative to the pivoting member;
a first fastener, wherein the sliding piece forms a mounting portion for engaging with the first fastener; and
a second fastener;
wherein the resilient member comprises a first mounting end fixed to the sliding piece and a second mounting end fixed to the pivoting member, the sliding piece defines a slot therein along a sliding direction of the sliding piece, the second mounting end of the resilient member snuggly fits about the second fastener that is extended through the slot to screw in the pivoting member, the first mounting end of the resilient member snuggly fits about the first fastener.

2. The electronic device of claim 1, wherein the first and second fasteners are bolts or rivets.

3. The electronic device of claim 1, wherein the resilient member is a flat undee-shaped spring with the first mounting end and the second mounting end formed at opposite ends thereof, the first and second mounting ends are ring-shaped.

4. The electronic device of claim 1, wherein the pivoting member forms two sliding rails at two opposite ends, for opposite ends of the sliding piece to slide therein.

5. A sliding apparatus comprising:
a pivoting member comprising a first side and a second side opposite to the first side, wherein the first side forms two sliding rails at opposite ends thereof;
a sliding piece capable of sliding relative to the pivoting member, with opposite ends of the sliding piece being slidably received in the sliding rails, and the sliding piece defining a slot along the sliding direction of the sliding piece, the sliding piece having two opposite side surfaces, one of the side surfaces facing to the pivoting member, the other of the side surfaces opposite to the pivoting member;

a resilient member positioned at the other of the side surfaces of the sliding piece opposite to the pivoting member for driving the sliding piece to slide relative to the pivoting member, wherein the resilient member comprises a first mounting end fixed to the sliding piece and a second mounting end fixed to the pivoting member;

a first fastener, wherein the sliding piece forms a mounting portion for engaging with the first fastener, the first mounting end of the resilient member is fixed to the first fastener; and a second fastener, wherein the pivoting member defines a mounting hole, the second fastener passes through the slot to engage in the mounting hole, the second mounting end of the resilient member is fixed to the second fastener.

6. The sliding apparatus of claim 5, wherein the first and second fasteners are bolts or rivets.

7. The sliding apparatus of claim 5, wherein the resilient member is a flat undee-shaped spring.

8. The sliding apparatus of claim 7, wherein the first mounting end and the second mounting end are formed at opposite ends of the resilient member.

9. The sliding apparatus of claim 8, wherein the first and second mounting ends are ring-shaped, to fit about the first and second fasteners, respectively.

* * * * *